United States Patent
Ohba et al.

(10) Patent No.: US 10,016,041 B2
(45) Date of Patent: Jul. 10, 2018

(54) HAIR REMOVAL TOOL

(71) Applicant: Panasonic Intellectual Property Management Co., Ltd., Osaka (JP)

(72) Inventors: Takafumi Ohba, Shiga (JP); Koji Asakawa, Shiga (JP); Masanobu Yamasaki, Shiga (JP); Yoichi Takaoka, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 576 days.

(21) Appl. No.: 14/767,282

(22) PCT Filed: Jan. 23, 2014

(86) PCT No.: PCT/JP2014/000344
§ 371 (c)(1),
(2) Date: Aug. 11, 2015

(87) PCT Pub. No.: WO2014/125772
PCT Pub. Date: Aug. 21, 2014

(65) Prior Publication Data
US 2016/0000202 A1 Jan. 7, 2016

(30) Foreign Application Priority Data
Feb. 13, 2013 (JP) ................ 2013-025918

(51) Int. Cl.
*H02P 29/02* (2016.01)
*A45D 26/00* (2006.01)
(Continued)

(52) U.S. Cl.
CPC ............ *A45D 26/00* (2013.01); *B26B 19/282* (2013.01); *H02P 25/032* (2016.02); *H02P 29/02* (2013.01);
(Continued)

(58) Field of Classification Search
CPC ....................................................... H02P 29/02
(Continued)

(56) References Cited

U.S. PATENT DOCUMENTS

| 5,574,346 A * | 11/1996 | Chavan .................. G01R 31/34 318/434 |
| 5,671,535 A | 9/1997 | Van Der Borst et al. |
| 2008/0201955 A1 | 8/2008 | Leung |

FOREIGN PATENT DOCUMENTS

| DE | 19601780 C1 | 6/1997 |
| JP | 63-186380 A | 11/1988 |

(Continued)

OTHER PUBLICATIONS

European Extended Search Report dated Apr. 25, 2016 issued in European Patent Application No. 14751514.2.
(Continued)

*Primary Examiner* — David S Luo
(74) *Attorney, Agent, or Firm* — McDermott Will & Emery LLP (57) ABSTRACT

A hair removal tool is equipped with: a drive unit for driving a blade; a load detection unit for detecting the size of the load on the drive unit; and a control unit for changing the drive mode of the drive unit between a first drive mode for driving the drive unit at a first drive speed, a second drive mode for driving the drive unit at a second drive speed which is faster than the first drive speed, and a transition mode for driving the drive unit at a transition speed which is faster than the second drive speed. A first interval is set as the interval from when the drive mode is changed from the first drive mode to the transition mode until when the drive mode is changed from the transition mode to the second drive mode. A second interval is set as the interval from when the drive mode is changed from the transition mode to the second drive mode until when the drive mode is changed (Continued)

from the second drive mode to the first drive mode. The first interval is shorter than the second interval.

9 Claims, 6 Drawing Sheets

(51) Int. Cl.
*B26B 19/28* (2006.01)
*H02P 25/032* (2016.01)
*H02K 33/16* (2006.01)

(52) U.S. Cl.
CPC ........ *A45D 2026/008* (2013.01); *H02K 33/16* (2013.01)

(58) Field of Classification Search
USPC .................................................. 318/139, 34
See application file for complete search history.

(56) References Cited

FOREIGN PATENT DOCUMENTS

| | | |
|---|---|---|
| JP | 4-236978 B2 | 8/1992 |
| JP | 07-194862 A | 8/1995 |
| JP | 09-501091 A | 2/1997 |
| JP | 2002-306867 A | 10/2002 |
| JP | 2002-320399 A | 10/2002 |
| WO | 2007/106412 A2 | 9/2007 |

OTHER PUBLICATIONS

International Preliminary Report on Patentability dated Aug. 18, 2015 issued in International Patent Application No. PCT/JP2014/000344.
International Search Report dated Mar. 18, 2014 issued in International Patent Application No. PCT/JP2014/000344.

* cited by examiner

Fig.1

1: Hair Removal Tool
12: Blade
20: Driver
30: Controller
40: Load Detector

HAIR REMOVAL TOOL

RELATED APPLICATIONS

This application is the U.S. National Phase under 35 U.S.C. § 371 of International Application No. PCT/JP2014/000344, filed on Jan. 23, 2014 which in turn claims the benefit of Japanese Patent Application No. 2013-025918 filed on Feb. 13, 2013, the disclosures of which applications are incorporated by reference herein.

TECHNICAL FIELD

The present invention relates to a hair removal tool.

BACKGROUND ART

Patent document 1 describes a hair removal tool including a controller that changes the drive speed of a driver in accordance with the amount of a load.

PRIOR ART DOCUMENT

Patent Document

Patent Document 1: Japanese Laid-Open Patent Publication No. 2002-306867

SUMMARY OF THE INVENTION

Problems that are to be Solved by the Invention

As described above, the controller of the hair removal tool changes the drive speed of the driver in accordance with the amount of a load. The drive speed reflects a hair condition, which produces the load. Thus, acknowledgement of a change in the drive speed allows a user to easily recognize the condition of the hair that is removed. However, conventional hair removal tools are not provided with a means for allowing easy recognition of changes in the drive speed.

It is an object of the present invention to provide a hair removal tool that allows a user to easily recognize changes in the drive speed.

Means for Solving the Problem

One aspect of the present invention is a hair removal tool. The hair removal tool includes a driver that drives a blade, a load detector that detects an amount of a load applied to the driver, and a controller. The controller shifts a drive mode of the driver among a first drive mode, in which the driver is driven at a first drive speed, a second drive mode, in which the driver is driven at a second drive speed, which is higher than the first drive speed, and a transition mode, in which the driver is driven at a transition speed, which is higher than the second drive speed. The controller shifts the drive mode from the first drive mode to the transition mode and then to the second drive mode, based on a detection result of the load detector, and shifts the drive mode from the second drive mode to the first drive mode, based on a detection result of the load detector. A first period is set that is from when the drive mode is shifted from the first drive mode to the transition mode until the drive mode is shifted from the transition mode to the second drive mode. A second period is set that is from when the drive mode is shifted from the transition mode to the second drive mode until the drive mode is shifted from the second drive mode to the first drive mode. The first period is shorter than the second period.

In the above configuration, it is preferred that the controller change the transition speed in accordance with a detection result of the load detector.

In the above configuration, it is preferred that the controller change the transition speed in accordance with a time elapsed from when the controller started to drive the driver.

In the above configuration, it is preferred that the hair removal tool include a battery charge state detector that detects a state of charge of a battery, which functions as a drive source of the driver. When the state of charge of the battery, which is detected by the battery charge state detector, is decreased from at least a lower limit to below the lower limit in the transition mode, the controller shifts the drive mode from the transition mode to the second drive mode and then to the first drive mode and executes a stop control.

In the above configuration, it is preferred that when the state of charge of the battery, which is detected by the battery charge state detector, is decreased from at least the lower limit to below the lower limit in the second drive mode and a predetermined period ends from when the drive mode is shifted from the transition mode to the second drive mode, the controller shift the drive mode from the second drive mode to the first drive mode and executes the stop control.

One aspect of the present invention is a hair removal tool. The hair removal tool includes a driver that drives a blade, a load detector that detects an amount of a load applied to the driver, and a controller. The controller shifts a drive mode of the driver among a first drive mode, in which the driver is driven at a first drive speed, a second drive mode, in which the driver is driven at a second drive speed, which is higher than the first drive speed, and a low speed transition mode, in which the driver is driven at a transition speed, which is lower than the first drive speed. The controller shifts the drive mode from the second drive mode to the low speed transition mode and then to the first drive speed, based on a detection result of the load detector, and shifts the drive mode from the first drive mode to the second drive mode, based on a detection result of the load detector. A first period is set that is from when the drive mode is shifted from the second drive mode to the low speed transition mode until the drive mode is shifted from the low speed transition mode to the first drive mode. A second period is set that is from when the drive mode is shifted from the low speed transition mode to the first drive mode until the drive mode is shifted from the first drive mode to the second drive mode. The first period is shorter than the second period.

Effect of the Invention

A hair removal tool of the present invention allows a user to easily recognize changes in the drive speed.

EMBODIMENTS OF THE INVENTION

First Embodiment

Figure 1:
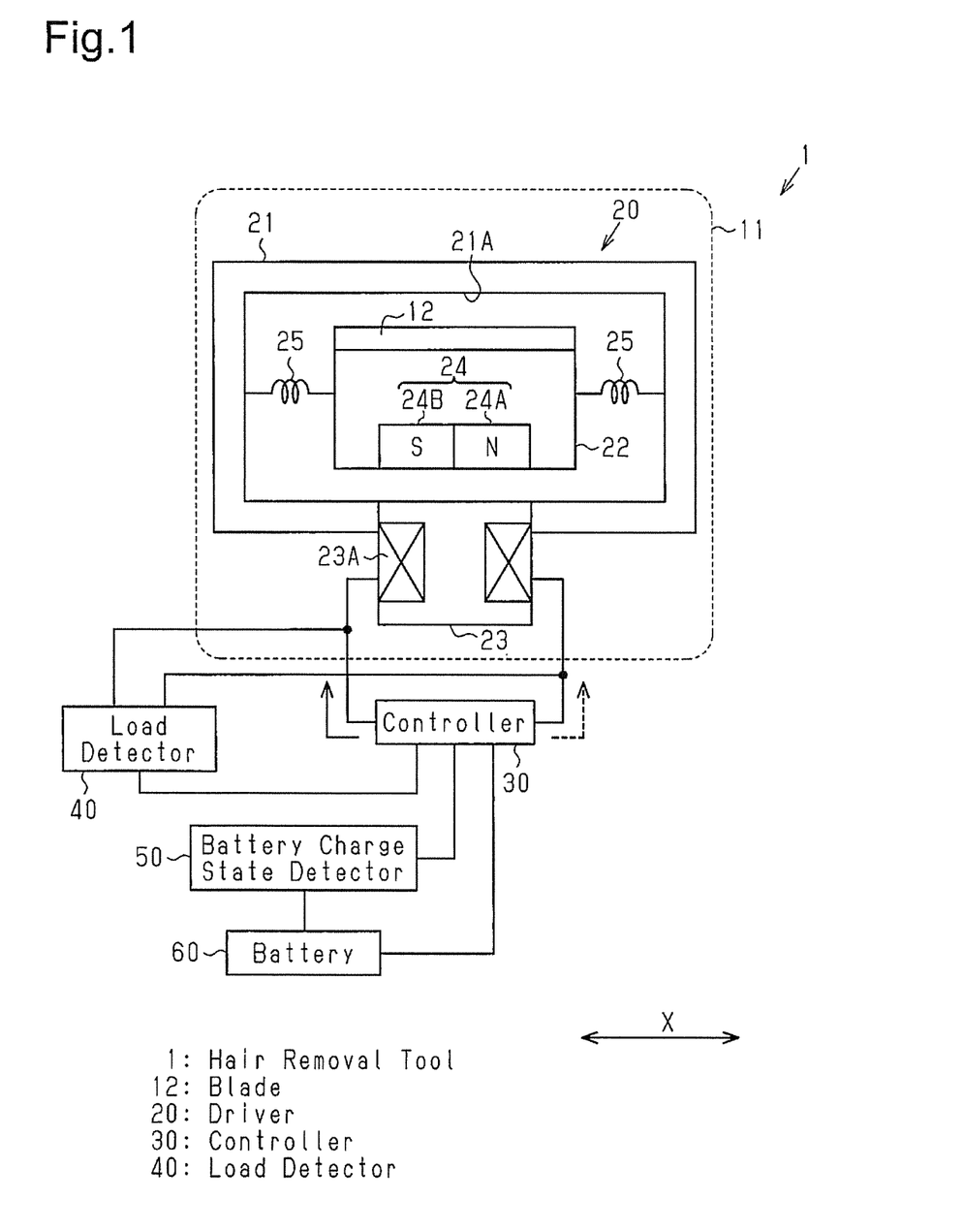
FIG. 1 is a schematic diagram entirely showing the structure of a first embodiment of a hair removal tool.

The structure of a hair removal tool 1, which functions as an electric shaver, will now be described with reference to FIG. 1.

The hair removal tool 1 includes a frame 11, a movable blade 12 functioning as a blade, a driver 20, a controller 30, a load detector 40, and a battery charge state detector 50. Additionally, the hair removal tool 1 uses a battery 60 as a drive source.

The frame 11 accommodates the movable blade 12, the driver 20, the controller 30, the load detector 40, the battery charge state detector 50, and the battery 60. The frame 11 holds an outer blade (not shown).

The driver 20 includes a stator 21, a movable element 22, an electromagnet 23, a permanent magnet 24, and a spring 25.

The stator 21 is fixed to the frame 11. The stator 21 includes an opening 21A. In the opening 21A, the movable element 22 is coupled to the stator 21 by two springs 25. The movable element 22 oscillates relative to the stator 21. The movable element 22 holds the movable blade 12.

Each spring 25 connects a wall surface in the opening 21A and one end of the movable element 22 in a movement direction X of the movable element 22.

The electromagnet 23 includes a coil 23A. The electromagnet 23 is coupled to the stator 21. For example, in the electromagnet 23, the coil 23A is wound around a sintered body or an iron plate of stacked magnetic materials.

The permanent magnet 24 includes a north pole 24A and a south pole 24B. The permanent magnet 24 is coupled to the movable element 22. More specifically, the north pole 24A and the south pole 24B are located beside each other in the movement direction X and magnetize the movable element 22. The north pole 24A and the south pole 24B are opposed to the coil 23A having a predetermined gap arranged in between.

The battery 60 supplies power to the controller 30.

The battery charge state detector 50 provides the controller 30 with a signal based on the state of charge of the battery 60 (hereafter, "battery charge state D")

The load detector 40 provides the controller 30 with a signal based on the amount of a load applied to the movable blade 12 (hereafter, "load S"). The load S is calculated using an induced voltage generated in the coil 23A. The induced voltage generated in the coil 23A corresponds to a driving force (e.g., moving amount, speed, or acceleration rate) of the movable element 22. In other words, a current flowing to the coil 23A corresponds to the driving force of the movable element 22. The driving force is affected by the amount of a load applied to the movable blade 12. Thus, the amount of the driving force decreases as the amount of the load applied to the movable blade 12 increases. Therefore, the load detector 40 calculates a driving force from the induced voltage and calculates the load S based on the driving force.

The operation of driving the driver 20 will now be described.

The controller 30 supplies power to the coil 23A. The controller 30 switches directions of the current supplied to the coil 23A. The controller 30 controls the amount of the current supplied to the coil 23A.

When the directions of the current supplied to the coil 23A are switched, the direction of the magnetic flux of the coil 23A is reversed. This oscillates the permanent magnet 24 and the movable element 22 relative to the electromagnet 23 and the stator 21. The movable element 22 holds the movable blade 12. This oscillates (drives) the movable blade 12 together with the movable element 22 relative to the stator 21. In this case, hair is guided into the outer blade (not shown) and caught between the outer blade (not shown) and the oscillating movable blade 12. Consequently, the hair is cut.

Operation modes of the driver 20 will now be described.

The hair removal tool 1 includes a plurality of drive modes. The drive modes include a first drive mode, a second drive mode, and a transition mode.

In each drive mode, the controller 30 controls the current supplied to the coil 23A so that the movable element 22 is driven at a constant drive speed (hereafter, "drive speed V").

In the first drive mode, the controller 30 controls the supply of current to the coil 23A so that the drive speed V of the movable element 22 becomes a first drive speed VA.

In the second drive mode, the controller 30 controls the supply of current to the coil 23A so that the drive speed V becomes a second drive speed VB, which is higher than the first drive speed VA.

In the transition mode, the controller 30 controls the supply of current to the coil 23A so that the drive speed V becomes a transition speed VC, which is higher than the second drive speed VB.

The controller 30 executes a drive mode shifting process, in which the drive mode is shifted based on the load S.

Figure 2:
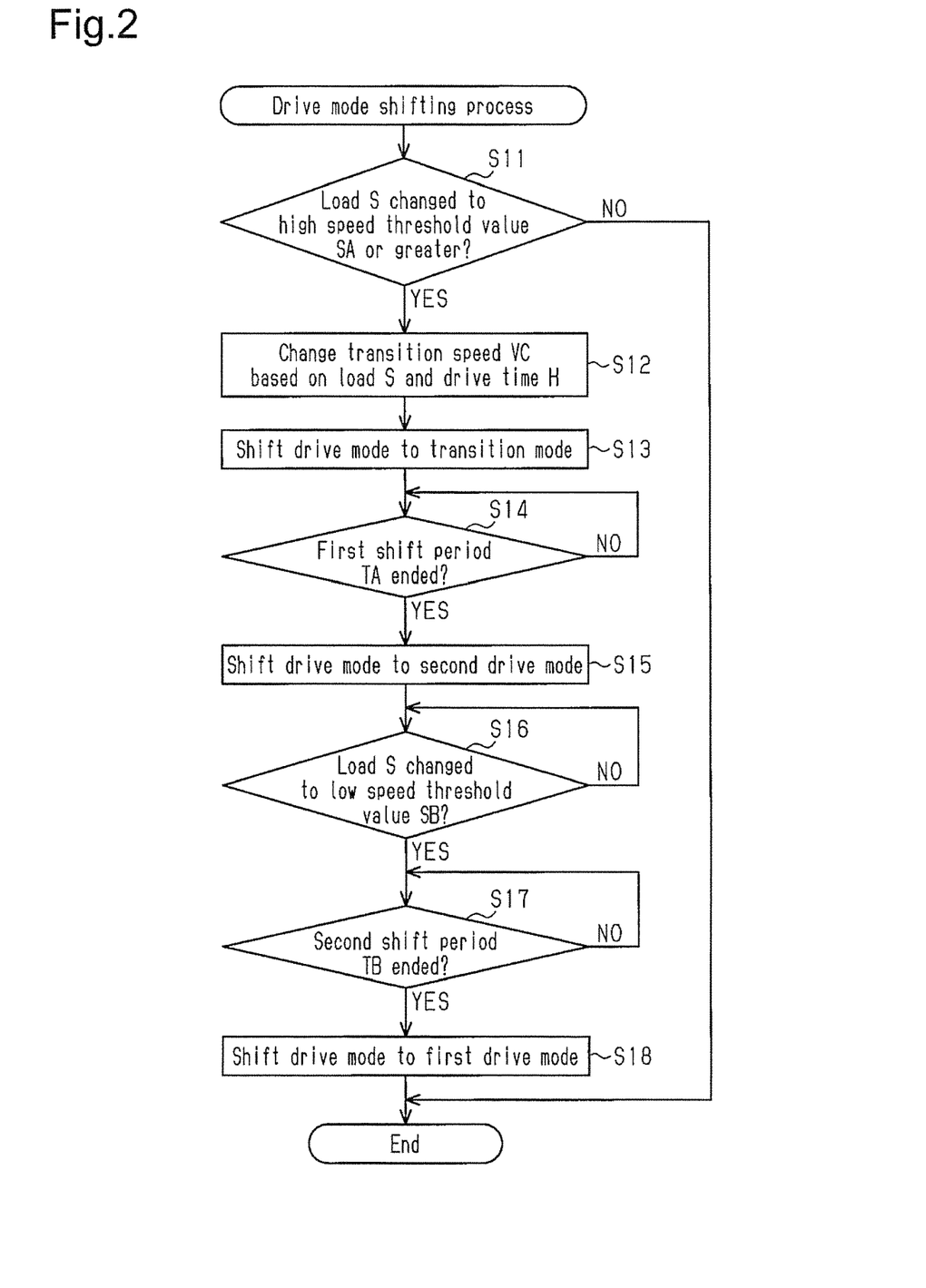
FIG. 2 is a flowchart showing the procedures for executing a "drive mode shifting process" in the first embodiment.

The drive mode shifting process will now be described with reference to FIG. 2.

In step S11, the controller 30 determines whether or not the load S has changed from a value less than a high speed threshold value SA to a value greater than or equal to the high speed threshold value SA. When determining that the load S has not changed from the value less than the high speed threshold value SA to the value greater than or equal to the high speed threshold value SA, the controller 30 terminates the process and, after a predetermined period, executes the determination process of step S11 again.

In step S11, when determining that the load S has changed from the value less than the high speed threshold value SA to the value greater than or equal to the high speed threshold value SA, in step S12, the controller 30 changes the transition speed VC based on the amount of the load S and the elapsed time from when the driving is started (hereafter, "drive time H").

In step S13, the controller 30 shifts the drive mode from the first drive mode to the transition mode. In this case, in the transition mode, the transition speed VC, which has been changed in step S12, is used.

The process for changing the transition speed VC in step S12 will now be described.

When the load S increases, it is assumed that a large amount of hair or stiff hair is being removed. Thus, as the load S increases, the controller 30 sets a relatively higher transition speed VC.

Additionally, when the drive time H increases, it is assumed that the battery charge state is becoming lower. A decrease in the transition speed VC saves power. Thus, as the drive time H becomes longer, the controller 30 sets a relatively lower transition speed VC.

In steps S14 and S15, when a first shift period TA ends from when the drive mode is shifted from the first drive mode to the transition mode, the controller 30 shifts the drive mode from the transition mode to the second drive mode.

In steps S16 to S18, when the load S is changed to a value less than a low speed threshold value SB and a second shift period TB ends from when the drive mode is shifted from the transition mode to the second drive mode, the controller 30 shifts the drive mode from the second drive mode to the first drive mode. More specifically, even when the load S is changed to the value less than the low speed threshold value SB, the controller 30 maintains the drive mode in the second drive mode until the second shift period TB ends.

The first shift period TA is shorter than the second shift period TB. A period from when the drive mode is shifted from the transition mode to the second drive mode to when the drive mode is shifted from the second drive mode to the first drive mode is longer than or equal to the second shift period TB. Thus, the first shift period TA is shorter than the period from when the drive mode is shifted from the transition mode to the second drive mode until the drive mode is shifted from the second drive mode to the first drive mode. Here, it is preferred that the first shift period TA be set to be approximately one third to one tenth of the second shift period TB.

One example of an execution of the control for shifting the drive mode will now be described with reference to FIG. 3.

At time t10, a calculation cycle starts immediately after the load S becomes the high speed threshold value SA or greater. At this time, the controller 30 shifts the drive mode from the first drive mode to the transition mode. At this time, the controller 30 changes the drive speed V from the first drive speed VA to the transition speed VC.

At time t11, the first shift period TA ends from time t10. At this time, the controller 30 shifts the drive mode from the transition mode to the second drive mode. At this time, the controller 30 changes the drive speed V from the transition speed VC to the second drive speed VB.

Figure 3:
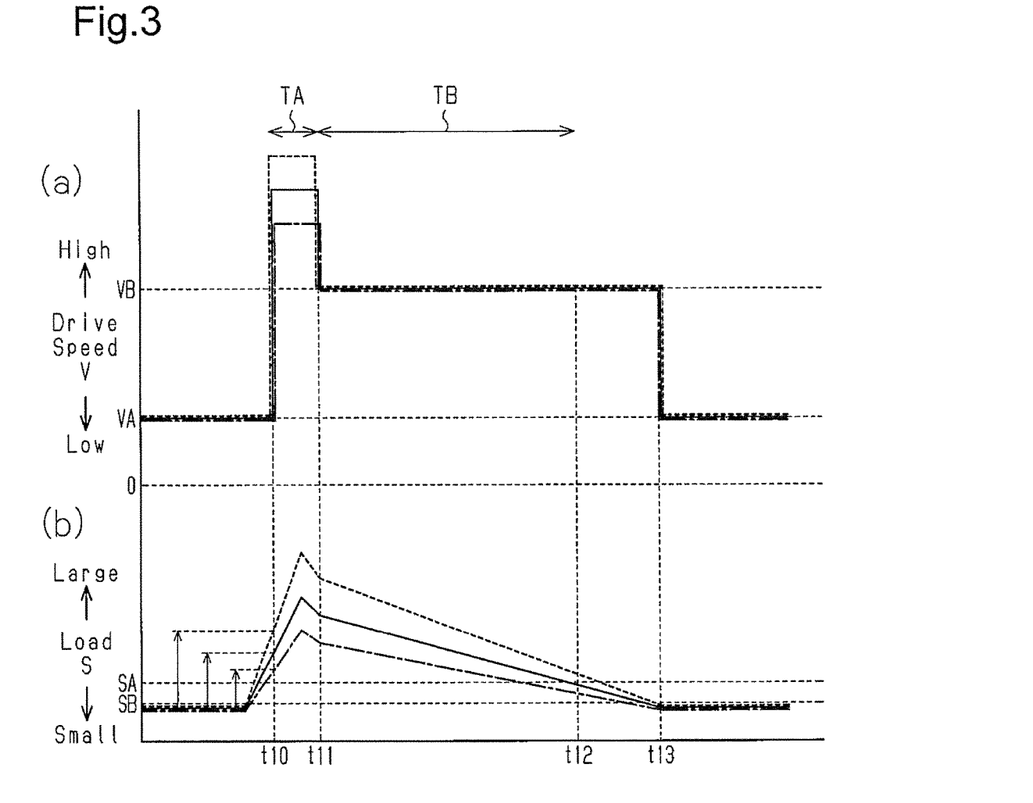
FIG. 3 is a timing chart showing one example of the "drive mode shifting process" executed in the first embodiment.

As indicated by the broken lines in FIG. 3, at time t11, when the load S is large, the transition speed VC is set to be a further high speed. Also, as indicated by the single-dashed lines, at time t11, when the load S is small, the transition speed VC is set to be a further low speed.

At time t12, the second shift period TB ends from time t11. At this time, the load S is greater than the low speed threshold value SB. Thus, the drive mode is maintained in the second drive mode.

At time t13, a calculation cycle starts immediately after the load S becomes below the low speed threshold value SB. At this time, the drive mode is shifted from the second drive mode to the first drive mode. At this time, the drive speed V is changed from the second drive speed VB to the first drive speed VA.

The controller 30 executes the drive mode shifting process based on the battery charge state D.

Figure 4:
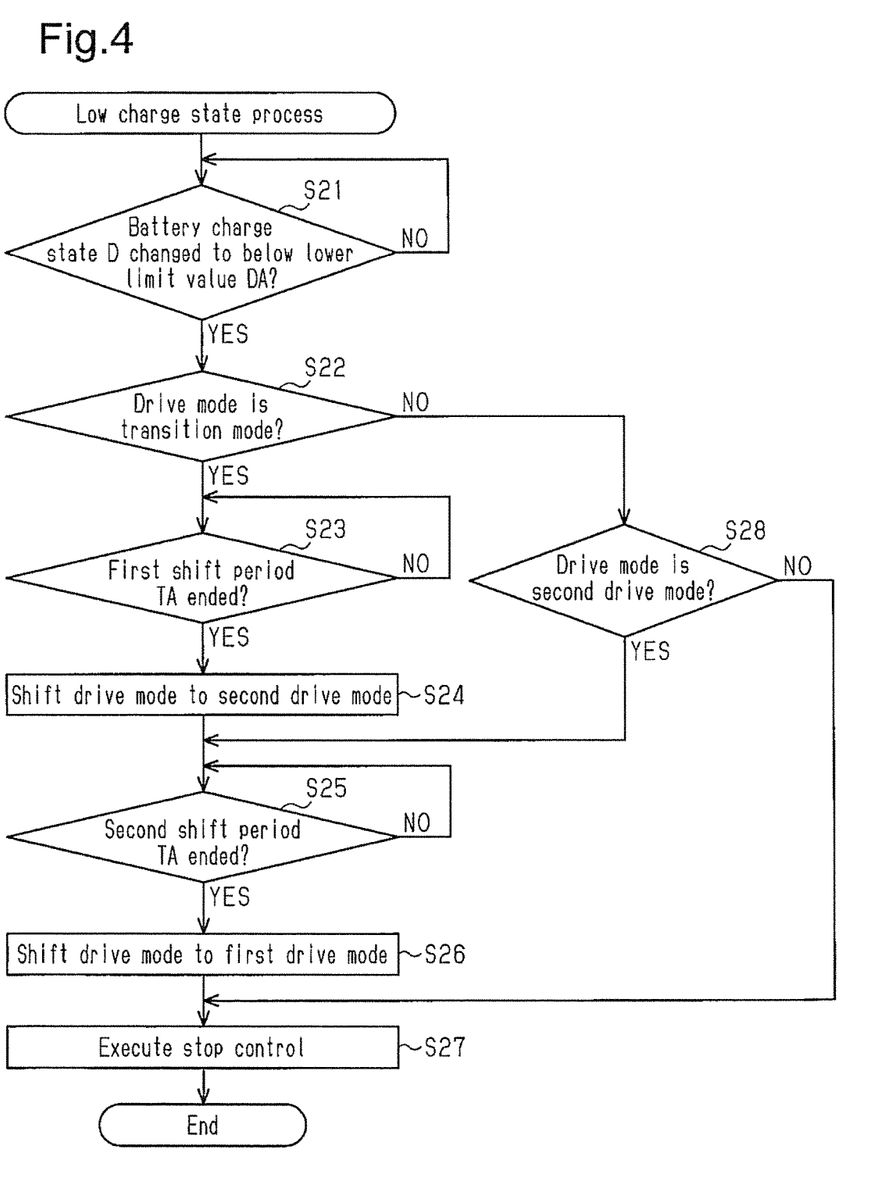
FIG. 4 is a flowchart showing the procedures for executing a "low charge state process" in the first embodiment.

The low charge state process will now be described with reference to FIG. 4.

In step S21, the controller 30 determines whether or not the battery charge state D has been changed to a lower limit value DA or less. When determining that the battery charge state D has not been changed to the lower limit value DA or less, the controller 30 terminates the present process and, after a predetermined period, executes the determination process of step S21 again.

When determining that the battery charge state D has been changed to the lower limit value DA or less, in step S22, the controller 30 determines whether or not the drive mode is transition mode.

When the controller 30 determines that the drive mode is the transition mode, in step S23 and step S24, when the first shift period TA ends from when the drive mode is shifted from the first drive mode to the transition mode, the controller 30 shifts the drive mode from the transition mode to the second drive mode.

In step S25 and step S26, when the second shift period TB ends from when the drive mode is shifted from the transition mode to the second drive mode, the controller 30 shifts the drive mode from the second drive mode to the first drive mode. More specifically, even when the load S is changed to below the low speed threshold value SB, the controller 30 maintains the drive mode in the second drive mode until the second shift period TB ends. Additionally, when the second shift period TB ends, the controller 30 shifts the drive mode to the first drive mode even when the load S is not changed to below the low speed threshold value SB.

After shifting the drive mode from the second drive mode to the first drive mode, in step S27, the controller 30 executes a stop control and terminates the present process. In the stop control, after the drive speed V is maintained at the first drive speed VA for a predetermined period, the drive speed V temporally decreases. Consequently, the driving of the driver 20 is stopped. Here, it is preferred that the decreasing rate of the drive speed V during the stop control be lower than the decreasing rate when the drive mode is shifted from the second drive mode to the first drive mode. When the battery charge state D is changed to the lower limit value DA or less, a detection result of the load detector 40 is invalidated. More specifically, the execution of the drive mode shifting process is prohibited.

In step S22 and step S28, when determining that the drive mode is the second drive mode, the controller 30 executes the processes of steps S25 to S27 and terminates the present process. Additionally, in step S22 and step S28, when determining that the drive mode is the first drive mode, the controller 30 executes the process of step S27 and terminates the present process.

Figure 5:
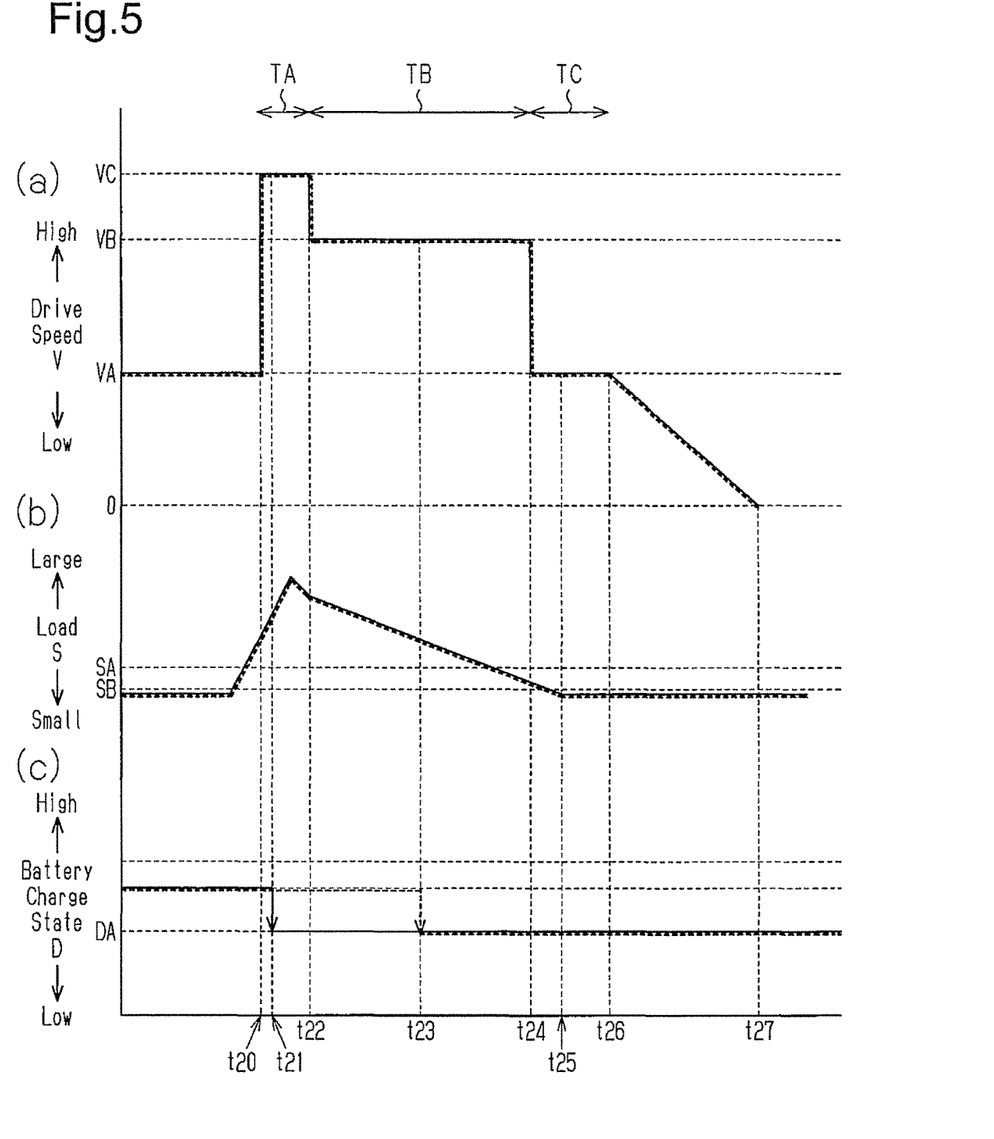
FIG. 5 is a timing chart showing one example of the "low charge state charge process" executed in the first embodiment.

With reference to the solid lines shown in FIG. 5, one example of an execution of the low charge state process will now be described when the battery charge state D is changed to the lower limit value DA in the transition mode.

At time t20, a calculation cycle starts immediately after the load S becomes the high speed threshold value SA or greater. At this time, the drive mode is shifted from the first drive mode to the transition mode. At this time, the drive speed V is changed from the first drive speed VA to the transition speed VC.

At time t21, the battery charge state D is decreased to the lower limit value DA.

At time t22, the first shift period TA ends from time t20. At this time, the drive mode is shifted from the transition mode to the second drive mode. At this time, the drive speed V is changed from the transition speed VC to the second drive speed VB.

At time t24, the second shift period TB ends from time t22. At this time, the load S is greater than the low speed threshold value SB. However, the battery charge state D has been decreased to the lower limit value DA. Thus, the drive mode is shifted from the second drive mode to the first drive mode. At this time, the drive speed V is changed from the second drive speed VB to the first driver speed VA.

At time t25, a calculation cycle starts immediately after the load S becomes below the low speed threshold value SB.

At time t26, a predetermined period TC ends from time t24. At this time, the drive speed V temporally decreases from the first drive speed VA.

At time t27, the drive speed V reaches "zero". Consequently, the driving of the driver 20 is stopped.

With reference to the broken lines shown in FIG. 5, one example of an execution of the low charge state process will now be described when the battery charge state D is decreased to the lower limit value DA in the second drive mode.

At time t22, the controller 30 shifts the drive mode from the transition mode to the second drive mode.

At time t23, the battery charge state D is decreased to the lower limit value DA.

At time t24, the second shift period TB ends from time t22. At this time, the load S is greater than the low speed threshold value SB. The battery charge state D has been decreased to the lower limit value DA. Thus, the drive mode is shifted from the second drive mode to the first drive mode. At this time, the drive speed V is changed from the second drive speed VB to the first drive speed VA.

At time t25, a calculation cycle starts immediately after the load S becomes below the low speed threshold value SB.

At time t26, the predetermined period TC ends from time t24. At this time, the drive speed V temporally decreases from the first drive speed VA.

At time t27, the drive speed V reaches "zero", and the driving of the driver 20 is stopped.

The operation of the hair removal tool 1 will now be described.

In the hair removal tool 1, the drive sound increases as the drive speed V increases. When the load S increases, the hair removal tool 1 shifts the drive mode from the first drive mode to the transition mode and then to the second drive mode. This increases the difference in the drive sound when shifting the drive mode. Thus, a user may easily recognize that the drive mode has been shifted.

In the hair removal tool 1, the load S increases when hair is cut. When the load S increases, the hair removal tool 1 shifts the drive mode from the first drive mode to the second drive mode, which is further faster, so that the hair may be easily removed. However, at the moment the cutting of hair starts, the load S increases. This hinders smooth cutting. When the load S increases, the hair removal tool 1 shifts the drive mode from the first drive mode to the transition mode and then to the second drive mode. Thus, at the moment of starting the hair cutting, the drive speed V is set to the transition speed VC, which is greater than the second drive speed VB. Consequently, at the moment of starting the hair cutting, the driving force of the driver 20 is increased. Thus, the hair may be smoothly cut.

After the hair cutting is started, it is assumed that the load S decreases. Thus, the drive mode is shifted to the second drive mode, which is lower in speed than the transition mode. This reduces power consumption.

Additionally, when the movable element 22 is driven with a relatively large driving force for an extremely long time, the effect on the skin of a user increases. In this regard, the first shift period TA is set to be shorter than the second shift period TB. Thus, the effect on the skin of a user due to the extremely high drive speed V may be limited compared to a configuration in which the first shift period TA is longer than the second shift period TB. Additionally, a smaller amount of power may be consumed compared to the configuration in which the first shift period TA is longer than the second shift period TB.

When the battery charge state D is decreased to the lower limit value DA or less, the drive mode may be the transition mode or the second drive mode. In such a case, the hair removal tool 1 shifts the drive mode to the first drive mode and then executes the stop control. More specifically, the stop control is started after the drive mode is shifted to the first drive mode. This simplifies the configuration of the stop control compared to a configuration in which each mode directly executes the stop control.

In the hair removal tool 1, the drive speed V is decreased at a lower rate during the stop control than the decreasing rate of the drive speed V when shifting from the second drive mode to the first drive mode. Thus, the change in the drive sound due to the shift of the drive mode differs from the change in the drive sound due to the stop control. This allows a user to easily recognize whether the change in the drive sound is due to the shift of the drive mode or due to the stop control.

The hair removal tool 1 has the advantages described below.

(1) When shifting the drive mode based on the load S, the controller 30 shifts the drive mode from the first drive mode to the transition mode and then to the second drive mode. The transition speed VC is greater than the second drive mode VB. The hair removal tool 1 increases the drive sound as the drive speed V increases. This increases the difference in the drive sound when shifting the drive mode compared to a configuration in which the drive mode is shifted from the first drive mode to the second drive mode without entering the transition mode. Thus, a user may easily recognize the change in the drive speed V.

(2) The controller 30 changes the transition speed VC in accordance with the amount of the load S. Thus, in the hair removal tool 1, the driver 20 may be driven at the transition speed VC that is appropriate for the hair condition, which produces the load S.

(3) When the load S is large, the controller 30 sets the transition speed VC to a relatively large value. When the load S is large, it is assumed that a large amount of hair or stiff hair is being removed. Thus, when the load S is large due to the cutting of such a large amount of hair or stiff hair, the drive speed V may be further increased. Consequently, hair may be smoothly removed.

(4) When the load S is small, the controller 30 sets the transition speed VC to a relatively small value. When the load S is small, it is assumed that a small amount of hair or fine hair is being removed. Thus, even when the drive speed V is decreased, the remaining hair may be smoothly removed. In the hair removal tool 1, the decreased drive speed V limits decreases in the battery charge state D.

(5) The state of the hair removal tool 1 differs between when the drive time H is long and when the drive time H is short. The controller 30 changes the transition speed VC based on the drive time H. Thus, in the hair removal tool 1, the driver 20 may be driven at the transition speed VC that is appropriate for the state of the hair removal tool 1 based on the drive time H.

(6) When the drive time H is long, the controller 30 sets the transition speed VC to a relatively small value. When the drive time H is long, the battery charge state D, which serves as the state of the hair removal tool 1, decreases. When the drive speed V is lower, a smaller amount of power is consumed. Thus, in the hair removal tool 1, decreases in the battery charge state D may be limited.

(7) When the battery charge state D is changed to the lower limit value DA or less, the controller 30 executes the stop control. This decreases the possibility of hair being caught between the movable blade 12 and the outer blade (not shown) when the driving of the movable blade 12 is stopped due to a low battery charge state D.

(8) When the drive mode is the transition mode, the battery charge state D may be changed to the lower limit value DA or less. In this case, after the first shift period TA and the second shift period TB ends, the controller 30 shifts the drive mode to the first drive mode and executes the stop control. Additionally, when the drive mode is the second drive mode, the battery charge state D may be changed to the lower limit value DA or less. In this case, after the second shift period TB ends, the controller 30 shifts the drive mode to the first drive mode and executes the stop control. This simplifies the stop control compared to a configuration in which each mode directly executes the stop control.

(9) In the hair removal tool 1, the decreasing rate of the drive speed V during the stop control is lower than the decreasing rate when the drive mode is shifted from the second drive mode to the first drive mode. That is, the decreasing rate of the drive speed V during the stop control differs from the decreasing rate when the drive mode is shifted from the second drive mode to the first drive mode. This allows a user to easily recognize whether a decrease in the drive speed V is due to the shift of the drive mode or due to the stop control.

Second Embodiment

The present embodiment of a hair removal tool 1 has a configuration that differs from that of the first embodiment of the hair removal tool 1 in the following point and has the same configuration in the other points. More specifically, the hair removal tool 1 changes the transition speed VC in accordance with the number of times the drive mode is shifted. In the description of the hair removal tool 1 of the second embodiment, the same reference characters are given to those components that are shared in the hair removal tool 1 of the first embodiment.

Figure 6:
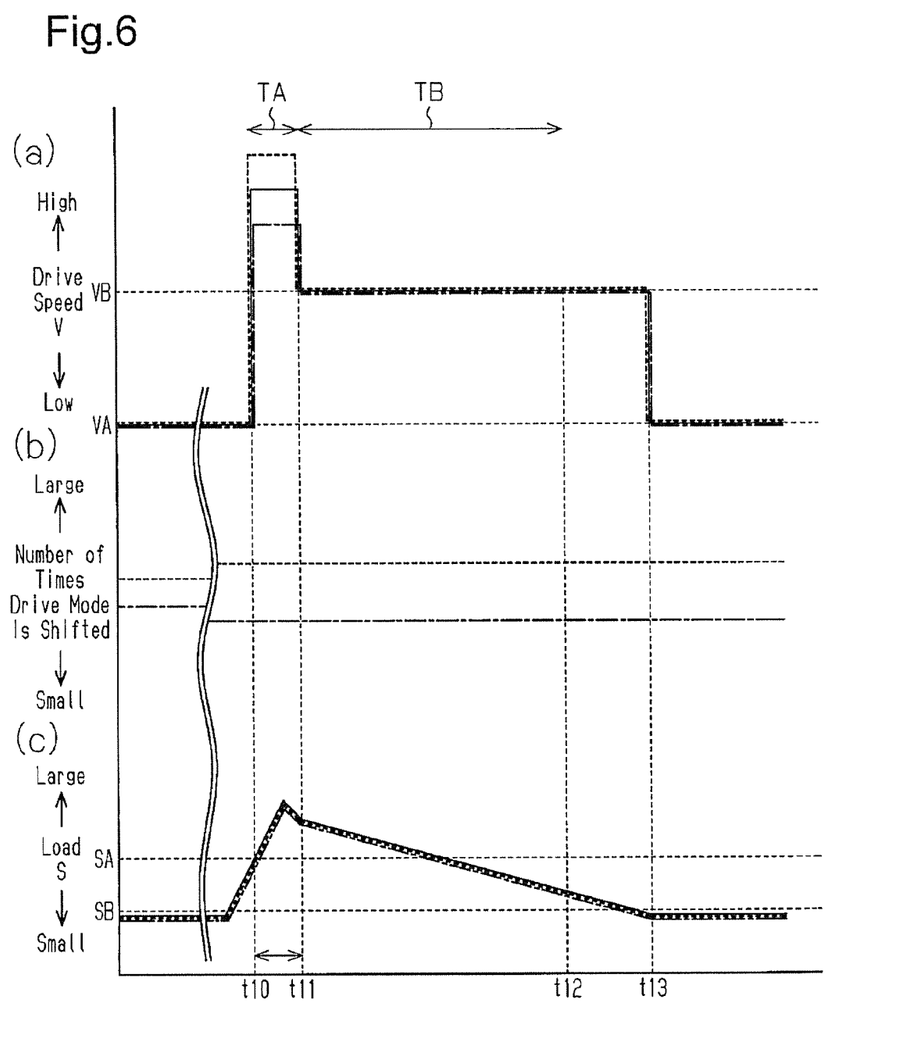
FIG. 6 is a timing chart showing one example of a "drive mode shifting process" executed in a second embodiment.

In step S12 of the drive mode shifting process, in addition to the amount of the load S and the drive time H, the controller 30 changes the transition speed VC in accordance with the number of times the drive mode is shifted in the most recent unit time. More specifically, as indicated by the broken lines shown in FIG. 6, at time t10, as the number of times the drive mode is shifted increases in the most recent unit time, a relatively larger value is set for the transition speed VC. Additionally, as indicated by the single-dashed lines shown in FIG. 6, at time t10, as the number of times the drive mode is shifted decreases in the most recent unit time, a relatively smaller value is set for the transition speed VC.

The operation of the hair removal tool 1 will now be described.

When the number of times the drive mode is shifted is large in the unit time, it is assumed that there is a large amount of hair in the area where the hair is being removed. Thus, the transition speed VC is increased as the number of times the drive mode is shifted increases. This smoothly drives the hair removal tool 1.

The hair removal tool 1 has the following advantages in addition to (1) to (9) of the first embodiment.

(10) The controller 30 changes the transition speed in accordance with the number of times the drive mode is shifted in the unit time. The number of times the drive mode is shifted reflects the hair removal condition, which produces the load S. Thus, the hair removal tool 1 drives the driver 20 at the transition speed VC that is appropriate to the hair removal condition, which produces the load S.

(11) When the number of times the drive mode is shifted is large in the unit time, the controller 30 increases the transition speed VC. When the number of times the drive mode is shifted is large in the unit time, it is assumed that there is a large amount of hair in the area where the hair is being removed. Thus, when cutting a large amount of hair, the drive speed V is further increased. Consequently, the hair may be smoothly removed.

In contrast, when the number of times the drive mode is shifted is large in the unit time, it is assumed that there is a small amount of hair in the area where the hair is being removed. Thus, even when the drive speed V is decreased, the remaining hair may be smoothly removed. In the hair removal tool 1, the decreased drive speed V limits decreases in the battery charge state D.

Other Embodiments

The present hair removal tool includes embodiments other than the above embodiments. Modified examples of the above embodiments will be described as other embodiments of the present hair removal tool. The modified examples may be each combined.

The hair removal tool 1 of each embodiment includes the transition mode, in which the driver 20 is driven at the drive speed V higher than that of the second drive mode. However, the hair removal tool 1 is not limited to such a configuration. For example, a modified example of the hair removal tool 1 includes a low speed transition mode instead of the transition mode. In the low speed transition mode, the driver 20 is driven at a transition speed VD that is lower than that of the first drive mode.

In the hair removal tool 1 of the modified example, when the load S is changed from at least a low speed threshold value SB to below the low speed threshold value SB, the controller 30 shifts the drive mode from the second drive mode to the low speed transition mode and then to the first drive mode. Additionally, when the load S is changed from below the high speed threshold value SA to at least the high speed threshold value SA, the drive mode is shifted from the first drive mode to the second drive mode.

The period from when the drive mode is shifted from the second drive mode to the low speed transition mode until the drive mode is shifted to the first drive mode, based on the change of the load S from at least the low speed threshold value SB to below the low speed threshold value SB, is shorter than the period from when the drive mode is shifted from the low speed transition mode to the first drive mode until the drive mode is shifted to the second drive mode, based on the change of the load S from below the high speed threshold value SA to at least the high speed threshold value SA. In the hair removal tool 1 of the modified example, the difference in the drive sound when shifting the drive mode is large compared to a configuration in which the drive mode is shifted from the second drive mode to the first drive mode without entering the low speed transition mode. Thus, a user may easily recognize the change in the drive speed. The modified example is referred to as a modified example X.

In the modified example X, the transition speed VD may be decreased as the load S increases. Additionally, in the modified example X, the transition speed VD may be increased as the drive time H becomes longer.

The hair removal tool 1 of each embodiment includes the first drive mode, the second drive mode, and the transition mode as the drive modes. However, the hair removal tool 1 is not limited to such a configuration. For example, a modified example of the hair removal tool 1 includes a fourth drive mode in which the driver 20 is driven at a drive speed V that is lower than that of the first drive mode. In the stop control, after the drive mode is shifted from the first drive mode to the fourth mode, the hair removal tool 1 of the modified example changes the drive speed V toward "zero" and stops driving the driver 20. In other words, in the stop control, the modified example of the hair removal tool 1 stops driving the driver 20 after shifting to the drive mode having the lowest speed.

In the low charge state process, when the battery charge state D is changed to below the lower limit value DA in the second drive mode, the hair removal tool 1 of each embodiment maintains the second drive mode until the second shift period TB ends. However, the hair removal tool 1 is not limited to such a configuration. For example, when the battery charge state D is changed to below the lower limit value DA, the hair removal tool 1 of the modified example maintains the second drive mode until a period differing from the second shift period TB ends. Additionally, when the battery charge state D is changed to below the lower limit value DA in the second drive mode, a further modified example of the hair removal tool 1 maintains the second drive mode until a period that is the same as the second shift period ends from when the battery charge state D is changed to below the lower limit value DA in the second drive mode.

In each embodiment, each mode is controlled so that the drive speed V is constant. However, the drive mode is not limited to such a configuration. For example, in a modified example of a drive mode, the drive speed V is changed while the same drive mode is maintained.

In the hair removal tool 1 of each embodiment, the transition speed VC is increased as the load S increases. However, the hair removal tool 1 is not limited to such a configuration. For example, in a modified example of the hair removal tool 1, the transition speed VC is changed in a stepped manner in accordance with the amount of the load S.

In the hair removal tool 1 of each embodiment, the transition speed VC is decreased as the drive time H becomes longer. However, the hair removal tool 1 is not limited to such a configuration. For example, in a modified example of the hair removal tool 1, the transition speed VC is changed in a stepped manner in accordance with the length of the drive time H. Additionally, in a further modified example of the hair removal tool 1, the transition speed VC is increased as the drive time H becomes longer.

In the hair removal tool 1 of each embodiment, the decreasing rate of the drive speed V during the stop control is lower than the decreasing rate when the drive mode is shifted from the second drive mode to the first drive mode. However, the hair removal tool 1 is not limited to such a configuration. For example, in the stop control, a modified example of the hair removal tool 1 changes the decreasing rate of the drive speed V in a stepped manner.

In the hair removal tool 1 of each embodiment, the stator 21 is fixed to the frame 11. However, the hair removal tool 1 is not limited to such a configuration. For example, a modified example of the stator 21 is connected to the frame 11 by an elastic member. Thus, the stator 21 vibrates relative to the frame 11 when the movable element 22 oscillates.

The load detector 40 of each embodiment detects the induced voltage generated in the coil 23A to detect the load S. However, the load detector 40 is not limited to such a configuration. For example, a modified example of the load detector 40 includes a sensor that directly detects the driving force of the movable element 22, such as a moving amount, speed, or an acceleration rate. The load S is calculated based on outputs of the sensor. In other words, any load detector may be employed as long as the load detector is capable of detecting the load S acting on the driver 20 from the blade 12.

The movable element 22 of each embodiment includes the permanent magnet 24. However, the movable element 22 is not limited to such a configuration. For example, a modified example of the movable element 22 includes an electromagnet.

In the driver 20 of each embodiment, the electromagnet 23 is coupled to the stator 21, and the permanent magnet 24 is coupled to the movable element 22. However, the driver 20 is not limited to such a configuration. For example, in a modified example of the driver 20, the electromagnet 23 is coupled to the movable element 22, and the permanent magnet 24 is coupled to the stator 21.

In the driver 20 of each embodiment, the movable element 22 oscillates relative to the stator 21. However, the driver 20 is not limited to such a configuration. For example, in a modified example of the driver 20, the movable element 22 rotates relative to the stator 21. In this case, the movable element 22 may be connected to a rotational shaft of a rotation motor.

The driver 20 of each embodiment may be changed to the following configuration. That is, the driver 20 includes a rotation motor and a converter that converts a rotational motion to a linear motion. In the driver 20 of the modified example, the rotation motor and the converter oscillate the movable element 22 relative to the stator 21.

Although applied to an electric shaver, the hair removal tool 1 of each embodiment is applicable to a different hair removal tool, such as a hair clipper or an epilator.

The invention claimed is:

1. A hair removal tool comprising:
   a driver that drives a blade;
   a load detector that detects an amount of a load applied to the driver; and
   a controller that shifts a drive mode of the driver among a first drive mode, in which the driver is driven at a first drive speed, a second drive mode, in which the driver is driven at a second drive speed, which is higher than the first drive speed, and a transition mode, in which the driver is driven at a transition speed that is higher than the second drive speed, wherein
   the controller shifts the drive mode from the first drive mode to the transition mode and then to the second drive mode based on a detection result of the load detector and shifts the drive mode from the second drive mode to the first drive mode based on a detection result of the load detector,
   a first period is set that is from when the drive mode is shifted from the first drive mode to the transition mode until the drive mode is shifted from the transition mode to the second drive mode,
   a second period is set that is from when the drive mode is shifted from the transition mode to the second drive mode until the drive mode is shifted from the second drive mode to the first drive mode, and
   the first period is shorter than the second period.

2. The hair removal tool according to claim 1, wherein the controller changes the transition speed in accordance with a detection result of the load detector.

3. The hair removal tool according to claim 1, wherein the controller changes the transition speed in accordance with a time elapsed from when the controller started to drive the driver.

4. The hair removal tool according to claim 1 comprising:
a battery charge state detector that detects a state of charge of a battery, which functions as a drive source of the driver, wherein
when the state of charge of the battery, which is detected by the battery charge state detector, is decreased from at least a lower limit to below the lower limit in the transition mode, the controller shifts the drive mode from the transition mode to the second drive mode and then to the first drive mode and executes a stop control.

5. The hair removal tool according to claim 4, wherein when the state of charge of the battery, which is detected by the battery charge state detector, is decreased from at least the lower limit to below the lower limit in the second drive mode and a predetermined period ends from when the drive mode is shifted from the transition mode to the second drive mode, the controller shifts the drive mode from the second drive mode to the first drive mode and executes the stop control.

6. The hair removal tool according to claim 1, wherein the controller changes the transition speed in accordance with a number of times the drive mode is shifted in a unit time.

7. A hair removal tool comprising:
a driver that drives a blade;
a load detector that detects an amount of a load applied to the driver; and
a controller that shifts a drive mode of the driver among a first drive mode, in which the driver is driven at a first drive speed, a second drive mode, in which the driver is driven at a second drive speed, which is higher than the first drive speed, and a low speed transition mode, in which the driver is driven at a transition speed which is lower than the first drive speed, wherein
the controller shifts the drive mode from the second drive mode to the low speed transition mode and then to the first drive speed based on a detection result of the load detector and shifts the drive mode from the first drive mode to the second drive mode based on a detection result of the load detector,
a first period is set that is from when the drive mode is shifted from the second drive mode to the low speed transition mode until the drive mode is shifted from the low speed transition mode to the first drive mode,
a second period is set that is from when the drive mode is shifted from the low speed transition mode to the first drive mode until the drive mode is shifted from the first drive mode to the second drive mode, and
the first period is shorter than the second period.

8. The hair removal tool according to claim 7, wherein the controller changes the transition speed in accordance with a detection result of the load detector.

9. The hair removal tool according to claim 7, wherein the controller changes the transition speed in accordance with a time elapsed from when the controller started to drive the driver.

* * * * *